United States Patent Office 3,438,468
Patented Apr. 15, 1969

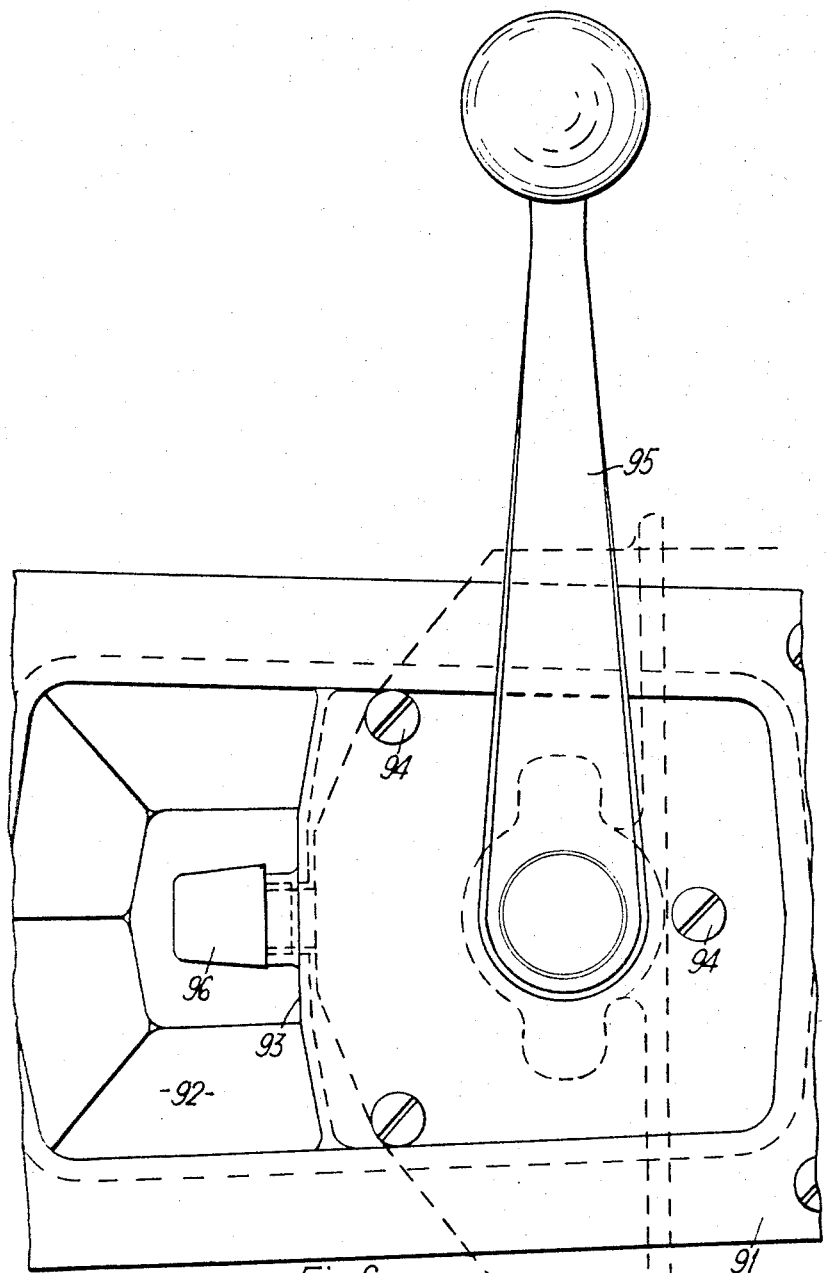

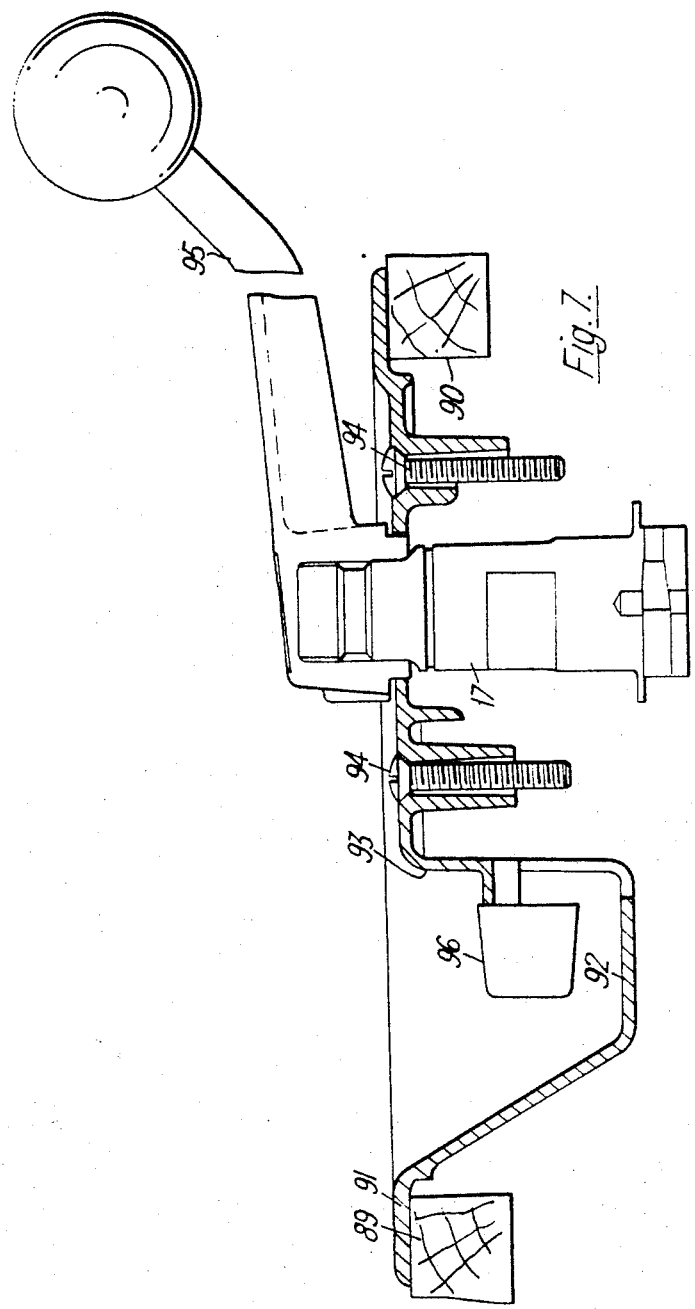

3,438,468
SINGLE HANDLE CONTROL MECHANISMS
James Frederick Hemens, Chelmsford, Essex, England, assignor to Teleflex Products Limited, Basildon, Essex, England, a British company
Filed May 18, 1966, Ser. No. 557,336
Claims priority, application Great Britain, May 18, 1965, 21,092/65; Aug. 2, 1965, 33,018/65
Int. Cl. F16d 47/00, 23/00; F16h 21/22
U.S. Cl. 192—.96       11 Claims

ABSTRACT OF THE DISCLOSURE

A single lever control mechanism including a housing with a main control shaft rotatably supported in the housing. A manual control handle is attached to the control shaft for rotating the control shaft in either direction from a neutral position. A first control member is rotatably supported by the housing and linkage means interconnects the control shaft and the first control member for rotating the first control member always in the same direction when the control shaft is rotated in either direction from the neutral position. A second control member is rotatably supported by the housing and a drive member is disposed on the control shaft and operatively engages the second control member for rotating the latter. A locking means normally locks the drive member to the control shaft whereby the drive member rotates with the control shaft but the locking means is movable to an unlocked position for allowing the first control member to be rotated independently of the second control member.

---

This invention relates to control mechanisms of the kind in which a single manual control handle is required to perform two control operations, simultaneously or in sequence, with provision for selection at will of the performance of only one operation without the other. A typical example of such a control requirement occurs in relation to marine engines for small boats and for convenience the invention will be described in such an environment in this application.

There are basically two control operations associated with a small boat engine during normal running. One is control of the throttle and the other is selection of forward or reverse gear through a clutch control, the latter operation being necessarily performed before the throttle is opened, or opened to any significant extent. But since it is the usual practice to open the throttle of an engine, without engaging any gear, at startup and for "warm-up" purposes the throttle control should be operable independently of the clutch control. It is an object of this invention to achieve the desired result in an advantageous way.

According to the present invention, in a control mechanism for performing two control operations in response to the movements of a single manual control handle, rotation of a main control shaft performs one operation through operative connections comprising a transmission linkage so arranged that a rockable output member of the linkage rocks in the same direction for angular movement of the shaft by the control handle away from a neutral position in either direction, and the second operation is performed through inter-engaging rotary members one of which is normally locked to the shaft to rotate therewith but can be unlocked at will to allow the first operation to take place without the second.

If the transmission linkage is designed to give little or no output movement of said rockable member within a predetermined range of angular control handle movement on either side of neutral, and said interengaging rotary members are arranged to run out of driving engagement when either of the limits of said predetermined range of movement is reached, the device possesses the necessary operating characteristics.

Figure 1:
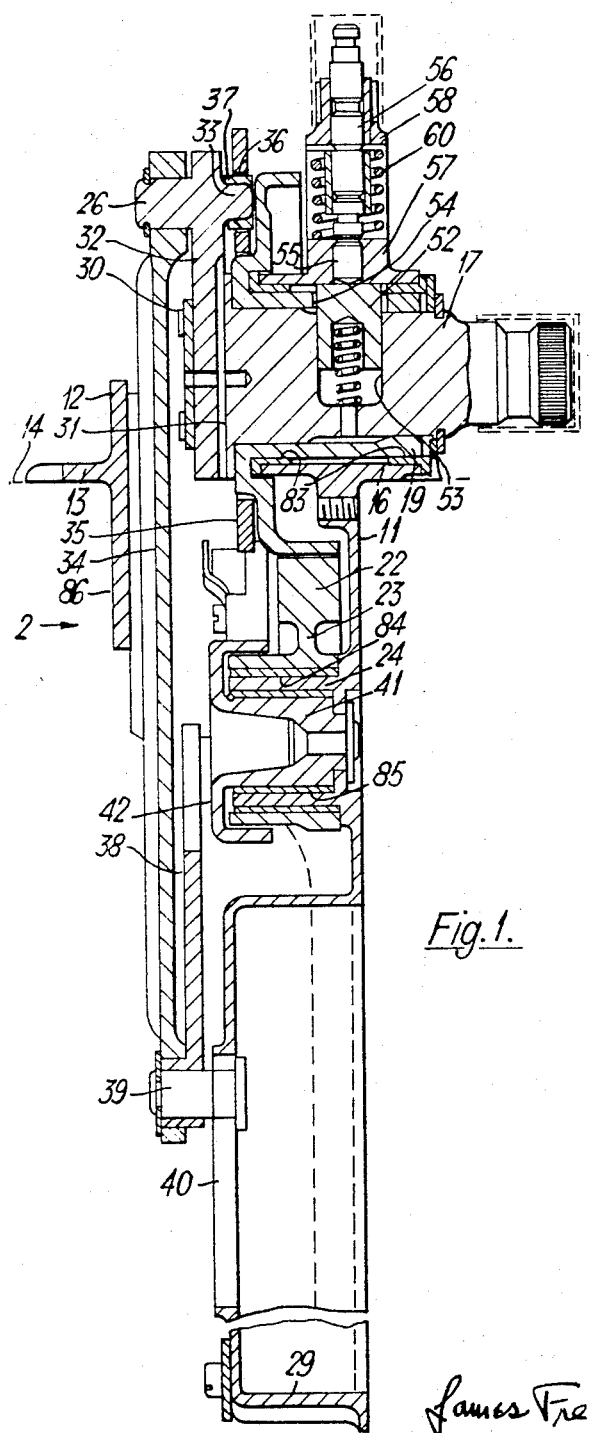
Figure 2:
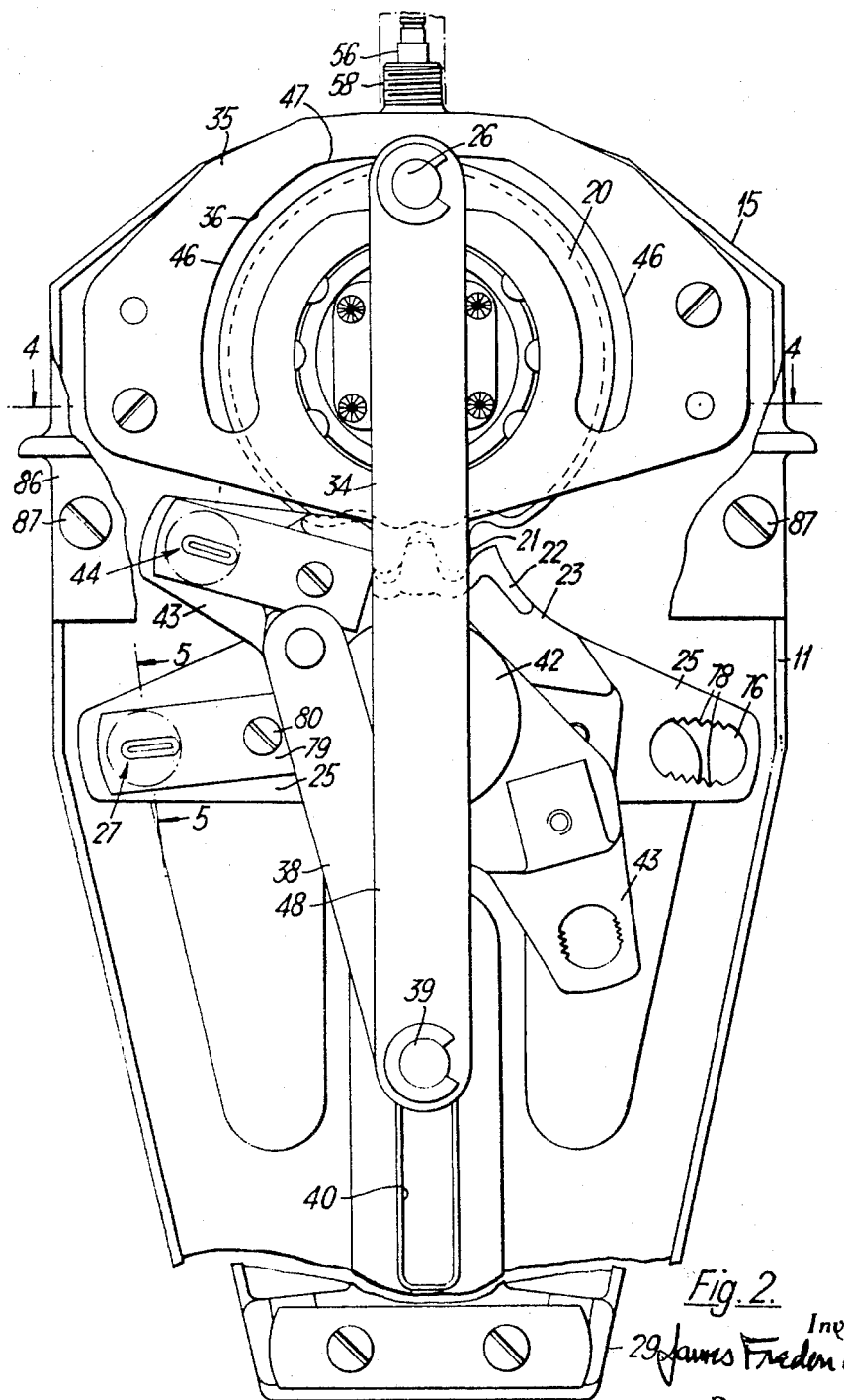
Figure 3:
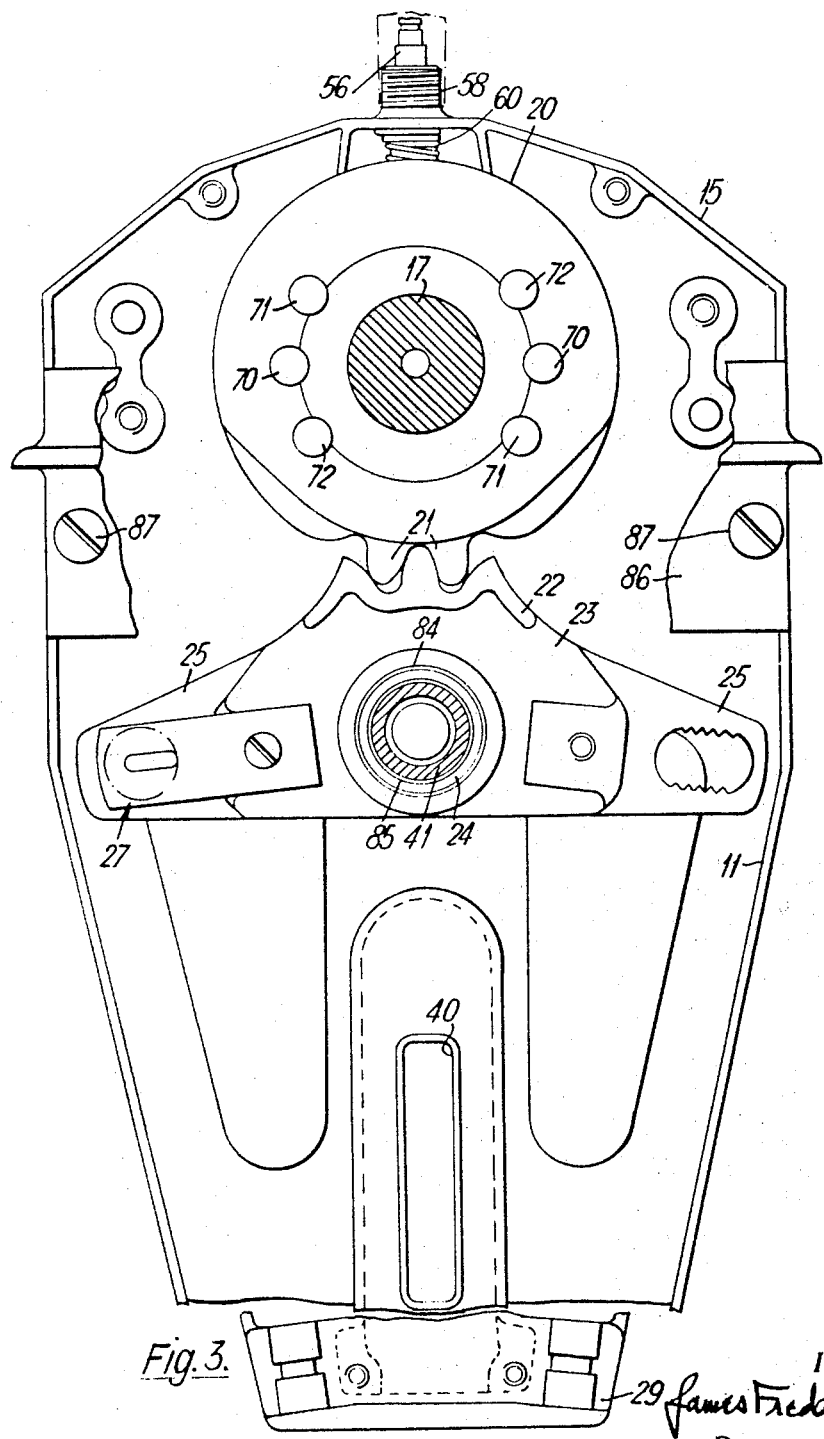
Figure 4:
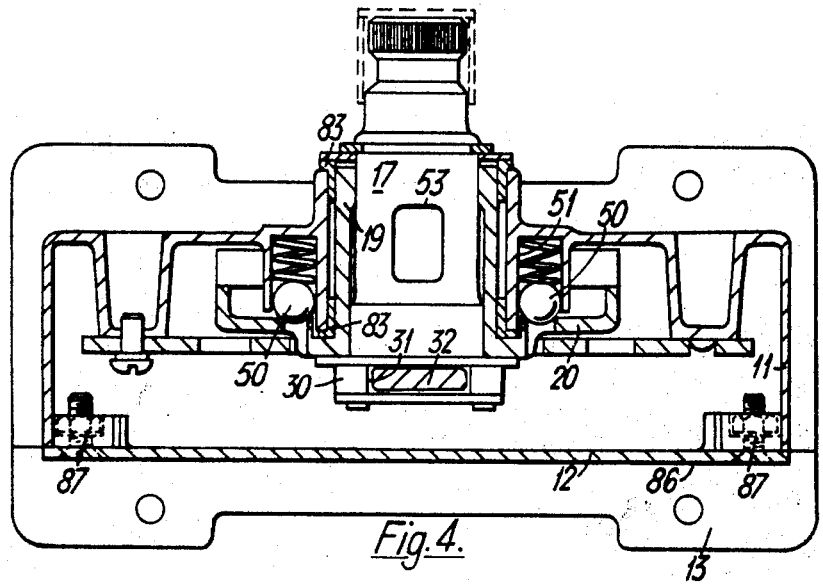
Figure 5:
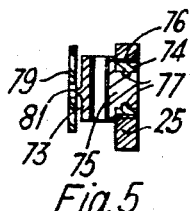
Figure 10:
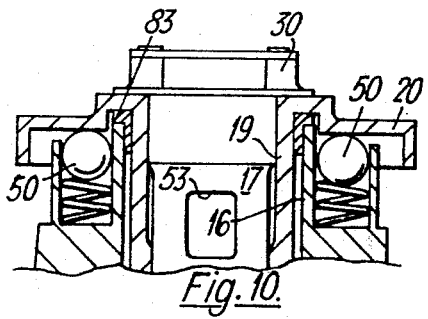
Figure 8:
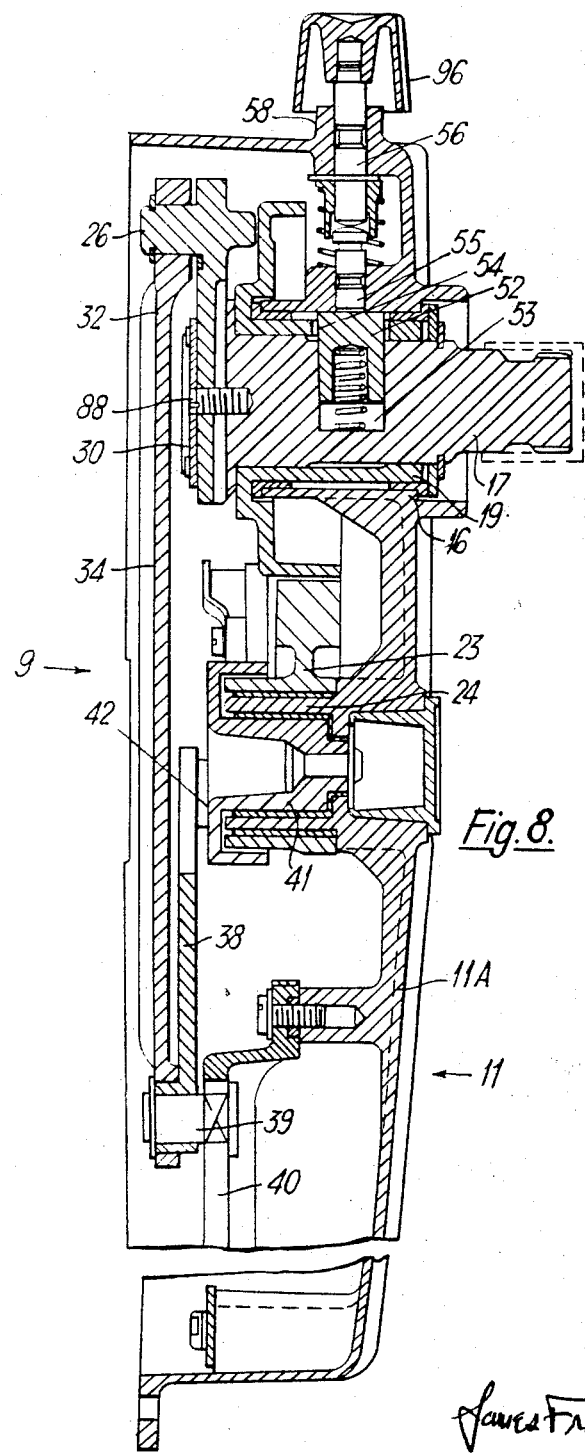
Figure 9:
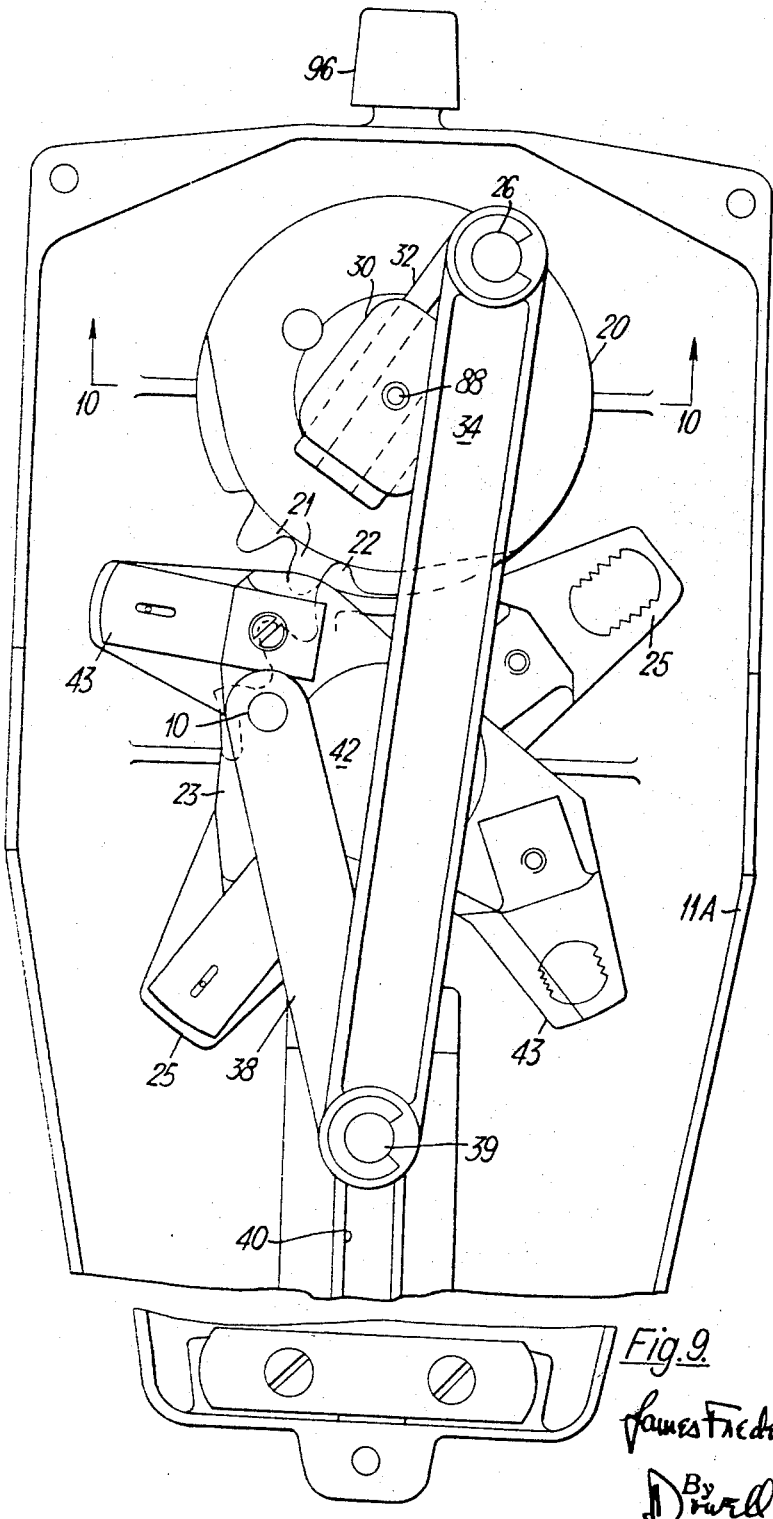
Figure 11:
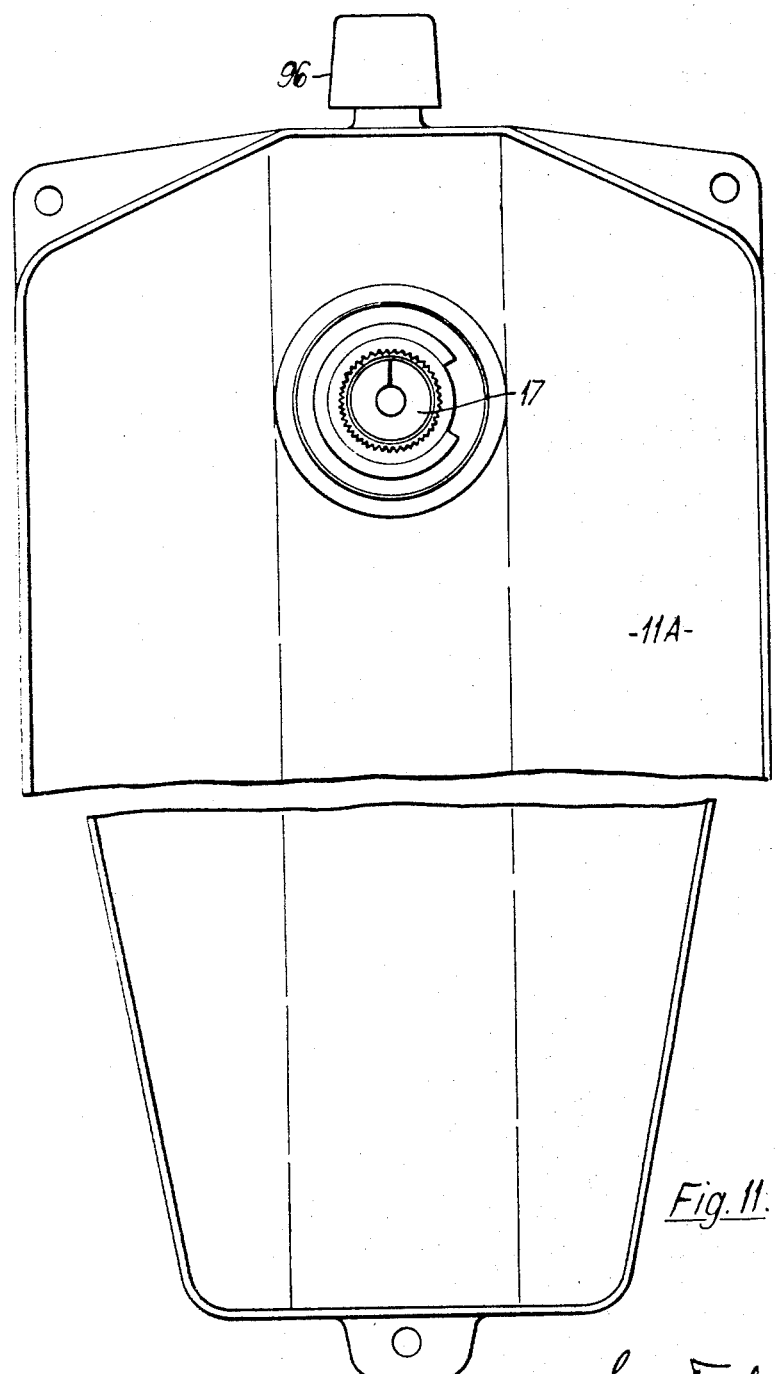
Figure 12:
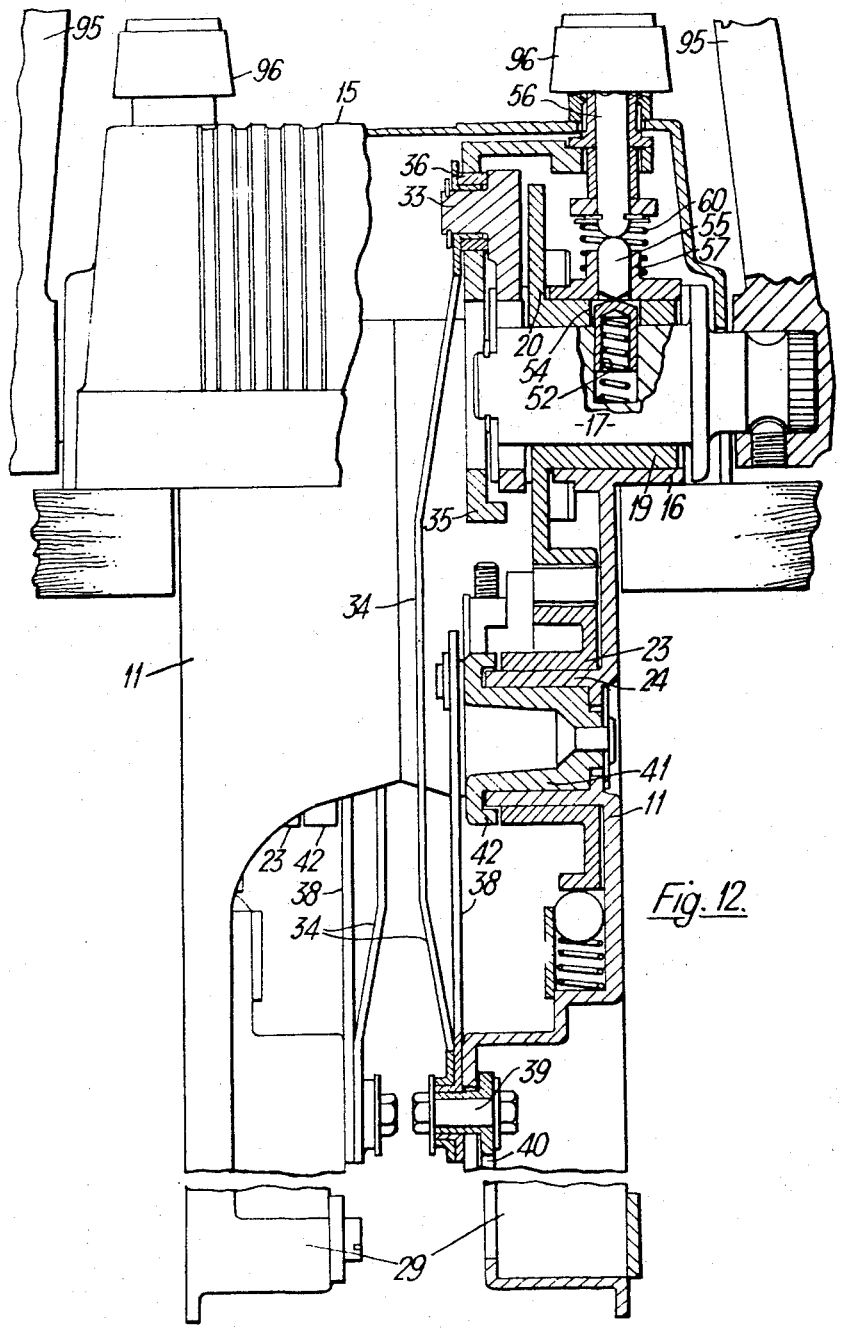

Forms of marine engine control unit in accordance with the invention will now be described by way of example and with reference to the accompanying drawings, in which:

FIGURE 1 is a side elevation, in section, of a desk-mounted control unit with its hood removed.
FIGURE 2 is a view of the direction of the arrow 2 of FIGURE 1,
FIGURE 3 is a view corresponding to that of FIGURE 2, with parts of the mechanism removed,
FIGURE 4 is a section on the line 4—4 of FIGURE 2, with some parts removed,
FIGURE 5 is a detail section on the line 5—5 of FIGURE 2,
FIGURES 6 and 7 illustrate a manner of side-mounting the unit of FIGURES 1 to 5 in a concealed position,
FIGURE 8 is a view, corresponding to FIGURE 1, of a modified form of control unit,
FIGURE 9 is a view in the direction of the arrow 9 of FIGURE 8, with the parts shown in the "idle ahead" setting instead of neutral,
FIGURE 10 is a detail view in section on the line 10—10 of FIGURE 9, with parts removed,
FIGURE 11 is a view in the direction of the arrow 11 of FIGURE 8, and
FIGURE 12 is an elevation, partly in section, of a desk-mounted double control unit for independent control of two engines.

Referring firstly to FIGURES 1 to 4, the control unit shown therein has a frame or housing 11, made up in two sections bolted together, with an upper part 12 of substantially rectangular form in plan surrounded by a horizontal flange 13. The flange enables the unit to be mounted on a control desk of a boat, with the greater part of the length of the frame 11 extending down below the desk through a rectangular hole cut therein, the level of the upper face of the desk being indicated at 14. The part of the frame 11 that stands above the desk 14, and the operative elements mounted thereon, are enclosed under a hood or cover 15 the lower edge of which seats on to the desk 14.

Formed in one wall of the frame 11 above the desk 14 is a horizontal bearing sleeve 16 in which is journalled a hollow hub 19 that in turn forms a bearing for a control shaft 17 passing through the hub. This shaft projects out through an aperture in the wall of the hood 15 and its external end receives an upstanding control handle (not shown). The hub 19 is an integral part of a wheel 20 that lies beyond the inner end of the sleeve 16. The wheel 20 has teeth 21 at the lower portion of its periphery which mesh with a short toothed arc 22 on a rotary clutch control member 23 that is journalled on a stub shaft 24 projecting from the frame 11. The clutch control member 23 has a pair of oppositely extending arms 25 and the core of a clutch control cable (not shown) is connected to one of these arms at 27. The cable extends down through the bottom end of the frame 11, the cable sheath being secured to a bottom bracket 29 of the frame.

The inner end of the control shaft 17 carries a guide 30 that has a slot 31 through which passes a radial arm 32 slidable in the slot. At its upper end the arm 32 is pivotally connected at 26 to a long depending link 34. Between the arm 32 and the wheel 20 there lies a vertical fixed cam plate 35 having a cam slot 36 into which projects a pin 33 integral with the upper end of the arm 32. A plastic bush or roller 37 surrounds the pin 33 and acts as a follower in the cam slot. The lower end of the long link 34 is pivotally connected to the lower end of a second shorter link 38 and the pivot pin 39 is disposed to slide vertically in a central vertical slot 40 in the lower part of the frame 11.

The stub shaft 24 is hollow and has journalled therein, concentrically with the clutch control member 23, the hub 41 of a rotary throttle control member 42. Like the clutch control member, the throttle control member 42 has a pair of oppositely-extending arms 43 and to the end of one of these is connected, at 44, the core of a throttle control cable (not shown). The throttle cable passes out through the bottom end of the frame 11 and its sheath is secured to the bottom bracket 29. The upper end of the link 38 is pivotally connected to the arm 43, to which the throttle cable is connected, at a position 10 intermediate the cable connection and the axis of rotation of the throttle control member 42.

It will be observed that the cam slot 36 in the fixed cam plate 35 has two arcuate side portions 46 which are struck about a centre coincident with the rotational axis of the control shaft 17, and these arcuate side portions are connected by a central top portion 47 which is substantially horizontal. The top portion 47 of the cam slot may in fact follow an arc of long radius struck abut a centre lying well down the vertical centre line 48 of the unit.

In the neutral setting of the control unit the cable arm 25 of the clutch control member 23 is substantially horizontal and the cable arm 43 of the throttle control member 42 is inclined upwardly as shown. The long link 34 is vertical, the cam follower 37 lying at the middle of the top portion 47 of the cam slot 36. When the control handle on the external end of the shaft 17 is moved angularly in either direction from neutral the first 35° of the movement is utilised for clutch operation, to engage either forward or reverse gear as the case may be, and thereafter the throttle is opened. The clutch control member 23 is rotated, during the first 35° of movement, by the wheel 20 and then the teeth 21, 22 move out of engagement and the clutch control member remains stationary during movement of the control handle in the range beyond 35° from neutral.

During engagement of forward or reverse gear little or no throttle control movement occurs because the cam follower 37 is riding along the horizontal, or nearly horizontal, portion 47 of the cam slot 36 as the arm 32 turns with the control shaft 17. However, after the first 35° of movement of the control shaft 17, in either direction from neutral, the arm 32 carries the follower 37 into one or other of the side arcuate portions 46 of the cam slot. When the cam follower is travelling in either of the side arcuate slot portions 46 there is considerable vertical movement of the pivot pin 39 at the lower end of the long link 34, and this causes the link 38 to turn the throttle control member 42. It will be noted that for movement of the control handle away from neutral, i.e. in the throttle opening direction, the travel of the pivot pin 39 in the slot 40 is always downward no matter which arcuate cam slot 46 the follower 37 is travelling in, and therefore the throttle control member 42 turns in the same direction for both angular directions of movement away from neutral of the control handle.

The hub 19 of the wheel 20 is normally locked to the control shaft 17 by a locking pin 52 sliding in a radial bore 53 in the shaft and spring-urged outwardly into a hole 54 in the hub wall. To enable the engine throttle to be actuated without engagement of the transmission, for starting, warm-up and like purposes, a press button control is provided that depresses the pin 52 out of the hole 54 by means of a plunger 55. The plunger 55 is housed for vertical sliding in a side entry 57 of the sleeve 16 and it is operated by a spindle 56 that slides vertically in a bearing 58 in a top member of the frame 11. The spindle 56 passes up through the top of the hood 15 and has a press button on its upper end. The spindle is urged upwardly by a return spring 60. It will be observed that depression of the pin 52 by the plunger 55 disconnects the hub 19 from the control shaft 17.

The clutch and throttle control members, to which the cables are connected, are centrally pivot-mounted and double-armed simply for the convenience or enabling the cable connections to be made on either side, and to allow double-cable push-pull connections to be utilised if desired.

By placing the throttle and clutch control members, that is to say the members directly connected to the cables, on the lower part of the frame, with transmission of the throttle-operating movement downward by means of the linkage employed, it has been possible to reduce the height to which the unit stands above the control desk of the boat. The design also makes possible access to the throttle and clutch control members and the cable connections from beneath the desk and without removal of the cover of the unit, and the cover can be removed without affecting the functioning of the unit.

To locate the wheel 20 in the neutral position, and in the positions of engagement of forward and reverse gear, two spring-pressed balls 50 are housed in pockets 51 in the frame on either side of the bearing sleeve 16 and bear against the wheel 20 which has three pairs of locating holes 70, 71, 72 cooperating with the balls. Not only do the balls 50 locate the wheel but they also take up backlash in the hub and shaft assembly 19, 17 and act as a damper in respect of throttle movement.

To compensate for wear in the engine it is desirable to provide for adjustment of the point of connection of the clutch cable along the arm 25. The cable is received in a trunnion 73 which has a shank 75 fitting within a bush or insert 74 that is in turn received in a somewhat elongated aperture 76 in the arm 25. The shank 75 is retained in the insert 74 by means of pips 77 located in cooperating depressions; the aperture 76 has opposite sides that are toothed or serrated as at 78 which are engaged by the insert 74. The arrangement allows the trunnion shank to be adjusted to various places along the aperture 76. A clamp plate 79 is held to the arm 25 by a screw 80 and overlies the trunnion 73, a pip 81 on the outer end of the trunnion being located in a slot 82 in the clamp plate.

A similar type of adjustment can also be provided for the throttle cable if desired, but is ordinarily not needed.

Plastic thrust washers and bearing sleeves are used in the assembly, metal to metal contact being avoided. Molynylon bearing sleeves are shown provided at 83, 84 and 85.

If desired, an adjustment of the throttle opening at idling speed can be provided by making the cam plate 35 adjustable vertically.

As an alternative to desk mounting the unit may be side mounted, in which case the flange 13 and a wall portion 86 of the frame 11, held in place by bolts 87 in the desk-mounted version, are removed.

FIGURES 6 and 7 illustrate how the unit modified in this way can be side-mounted in a concealed position behind a panel 89. The panel has an aperture 90 through which the control shaft 17 projects and which is closed by a fascia plate 91 that has a re-entrant portion 92 to provide an inwardly-directed ledge 93 through which the control spindle 56 emerges. In assembly, the shaft 17 and spindle 56 are passed through the appropriate openings in the plate 91 and the plate is secured to the frame 11 of the unit by means of screws 94. Then the main control handle 95 and the push botton 96 are fitted to the protruding portions of the shaft 17 and spindle 56, respectively.

FIGURES 8 to 11 show a modification of the unit in which the cam plate and follower roller are no longer employed in the throttle control. Instead the radial arm 32, to which the long link 34 is pivotally connected, is now pinned to the end of the shaft 17, as at 88, to prevent it sliding and therefore operates simply as a crank. This means that during the clutch-shifting range of movement of the shaft 17 the engine throttle is opened slightly as forward or reverse drive is engaged but the movement is small because the link 34 is in the region of outer dead centre.

The unit of FIGURES 8 to 11 is arranged as a surface side-mounting unit, in that the frame thereof is adapted for mounting on the external surface of a vertical panel. That is to say the frame 11A is now designed not only to provide a support for the other members of the assembly but also to serve as a cover, as shown.

FIGURE 12 of the drawings, in which parts having the equivalent function to those of earlier views are given like reference numerals, shows a double control unit for independent control of two engines, arranged for desk mounting and operating in the same manner as the embodiment of FIGURES 1 to 5.

What is claimed is:

1. A single lever control mechanism comprising; a housing, a main control shaft rotatably supported in said housing, a manual control handle attached to said control shaft for rotating said control shaft in either direction from a neutral position, a first control member rotatably supported by said housing, linkage means interconnecting said control shaft and said first control member for rotating said first control member always in the same direction when said control shaft is rotated in either direction from said neutral position, a second control member rotatably supported by said housing coaxially with said first control member, a drive member disposed on said control shaft and operatively engaging said second control member for rotating the latter, locking means normally locking said drive member to said control shaft whereby said drive member rotates with said control shaft, said locking means being movable to an unlocked position for allowing said first control member to be rotated independently of said second control member.

2. A mechanism as set forth in claim 1 wherein said drive member has a small number of drive teeth along a limited arc of its periphery, said second control member has a small number of driven teeth along a limited arc of its periphery, and said drive teeth and said driven teeth are in meshing engagement when said main control shaft is in said neutral position and run out of driving engagement at the limit of a predetermined range of movement of said drive member from neutral in either direction.

3. A mechanism as set forth in claim 1 wherein said drive member comprises; a hub coaxially surrounding said main control shaft, a locking pin slidable in a radial bore in said main control shaft and projecting into a hole in said hub for normally locking said hub to said control shaft, and control means for moving said locking pin out of said hole in said hub, a spring biasing said locking pin against sliding movement by said control means.

4. A mechanism as set forth in claim 1 including a first flexible transmission cable connected at one end to said first control member and adapted to be connected at the other end thereof to an engine throttle control, and a second flexible transmission cable connected at one end to said second control member and adapted to be connected at the other end to an engine clutch control.

5. A mechanism as set forth in claim 4 including coupling means for adjusting the position of connection of said second cable to said second control member in a direction radially of the axis of rotation of said second control member.

6. A mechanism as set forth in claim 1 wherein said first control member rotates about an axis which is fixed with respect to said housing.

7. A mechanism as set forth in claim 6 wherein said linkage means includes a radial crank arm rotatable with said main control shaft and a first link pivotally connected at a first end to said crank arm and operatively connected at the second end to said first control member, said mechanism having a central axis, means confining movement of said second end of said first link to sliding movement parallel with said central axis, the longitudinal axis of said first link being parallel with said central axis when said main control shaft is in said neutral position.

8. A mechanism as set forth in claim 7 including means mounting said crank arm for radial sliding movement relative to said main control shaft, a cam plate having a cam slot therein, and a cam follower disposed at the pivotal connection between said crank arm and said first link and guided by said cam slot.

9. A mechanism according to claim 8 wherein said cam slot is symmetrical about said central axis of the mechanism and comprises two arcuate terminal portions joined by a substantially straight intermediate portion, said straight portion being at right angles to said central axis.

10. A mechanism as set forth in claim 9 including a second link pivotally connected to said first control member at a position displaced from the axis of rotation of said first control member, said second end of said first link being pivotally connected to said second link.

11. A mechanism as set forth in claim 10 wherein said axis of rotation of said first control member intersects said central axis.

References Cited

UNITED STATES PATENTS

| | | | |
|---|---|---|---|
| 2,826,283 | 3/1958 | Morse | 192—.096 |
| 157,765 | 12/1874 | Ruggles | 74—44 X |
| 739,378 | 9/1903 | Beyer | 74—44 |
| 2,529,182 | 11/1950 | Panish | 192—.096 |
| 2,987,152 | 6/1961 | Morse | 192—.098 X |
| 3,115,050 | 12/1963 | Marr | 74—876 |
| 3,018,434 | 1/1962 | Zocholl | 74—68 X |
| 2,804,782 | 9/1957 | Erxleben | 192—.098 X |
| 2,847,870 | 8/1958 | Erxleben | 192—.098 X |
| 2,907,421 | 10/1959 | Morse et al. | 192—.096 |
| 2,966,969 | 1/1961 | Morse | 192—.098 |
| 3,204,732 | 9/1965 | Morse | 192—.096 |

FRED C. MATTERN, JR., *Primary Examiner.*

CAROLYN F. GREEN, *Assistant Examiner.*

U.S. Cl. X.R.

74—44, 471